United States Patent [19]

Burkhart et al.

[11] 4,163,516

[45] Aug. 7, 1979

[54] METHOD FOR JOINING METAL BY SOLID-STATE BONDING

[75] Inventors: L. Elkin Burkhart, Oak Ridge; Chester R. Fultz, Kingston; Kerry A. Maulden, Knoxville, all of Tenn.

[73] Assignee: The United States of America as represented by the United States Department of Energy, Washington, D.C.

[21] Appl. No.: 865,360

[22] Filed: Dec. 28, 1977

[51] Int. Cl.$^2$ ............................................. B23K 19/02
[52] U.S. Cl. .................................. 228/114; 228/221
[58] Field of Search ................. 228/112, 114, 2, 221, 228/115, 116

[56] References Cited

U.S. PATENT DOCUMENTS

| | | | |
|---|---|---|---|
| 3,006,068 | 10/1961 | Anderson et al. | 228/115 |
| 3,121,948 | 2/1964 | Hollander et al. | 228/114 |
| 3,771,706 | 11/1973 | Martens | 228/2 |
| 3,840,168 | 10/1974 | Searle et al. | 228/2 |
| 3,860,468 | 1/1975 | Scherer | 228/2 X |

OTHER PUBLICATIONS

Svarka, "The Vacuum Friction Welding of High-Melting and High-Temperature Alloys", Auto. Weld. (GB) vol. 25, No. 6 (1972).

*Primary Examiner*—Francis S. Husar
*Assistant Examiner*—Kenneth J. Ramsey
*Attorney, Agent, or Firm*—Dean E. Carlson; Stephen D. Hamel; Earl L. Larcher

[57] ABSTRACT

The present development is directed to a method for joining metal at relatively low temperatures by solid-state bonding. Planar surfaces of the metal workpieces are placed in a parallel abutting relationship with one another. A load is applied to at least one of the workpieces for forcing the workpieces together while one of the workpieces is relatively slowly oscillated in a rotary motion over a distance of about 1°. After a preselected number of oscillations, the rotary motion is terminated and the bond between the abutting surfaces is effected. An additional load may be applied to facilitate the bond after terminating the rotary motion.

3 Claims, No Drawings

METHOD FOR JOINING METAL BY SOLID-STATE BONDING

This invention was made in the course of, or under, a contract with the U.S. Department of Energy.

The present invention relates generally to a method of joining metallic workpieces, and more particularly to an improved method of solid-state bonding metallic workpieces by using a slow oscillating motion with a very limited extent of travel during the oscillation.

Solid-state bonding procedures have been utilized for providing metallurgically sound joints without the application of external heat which is particularly advantageous for inhibiting or minimizing metallurgical and dimensional distortions at the joint. In providing a solid-state bond between workpieces, the surfaces of the workpieces to be joined are leveled by machining and/or grinding to a substantially uniform flatness. Machining lubricants and other impurities, e.g. oxides, on the mating surfaces are removed by suitable agents and these surfaces are then pressed together in vacuum. While this pressing takes place, one or both of the workpieces are rotated until sufficient friction heat is developed to join the two surfaces with a solid-state bond upon the cessation of the rotation.

The tenacity of the bond or joint formed between the mating surfaces in solid-state bonding procedures is dependent upon intimate contact between the surfaces with the better bond being provided with the more intimate contact between the surfaces. The amplitude of the imperfections, i.e. peaks and valleys, between the mating surfaces, caused by the machining and other surface-leveling techniques are lessened by the oscillation of the workpieces so as to improve the intimate contact between the surfaces.

Applicants have found that in solid-state bonding processes that the oscillation of the workpieces as previously practiced did in fact lessen the amplitude of the surface imperfections defined by the peaks and valleys between the mating surfaces but that this rotary motion also caused some surface imperfections to be increased. For example, a protuberance, i.e. a peak, on one of the mating surfaces being rotated through a considerable arc about the surface will form a corresponding valley in the mating surface through the entire arc of rotation. Thus, when the pieces are in their final orientation there would be a valley of considerable length in one of the mating surfaces which would not be in contact with the opposite mating surface. Multiplying this imperfection manyfold, as would be caused by the many peaks and valleys in the mating surface, would lead to a substantial percentage of the mating surfaces with less than the desired level of contact, with a significant portion of this percentage being due to the oscillating technique being employed during the solid-state joining procedure.

Accordingly, it is a primary goal or objective of the present invention to substantially minimize or obviate the problems heretofore suffered by practicing prior art solid-state joining techniques. This goal of the present invention is achieved by placing the clean planar surfaces of each workpiece in a parallel relationship with one another, applying a pressure loading on at least one of the workpieces for forcing the surfaces together and then oscillating one of the workpieces in a rotary motion a distance of up to about 1° of travel during application of the loading for effecting the solid-state bond upon termination of the oscillation. By limiting the oscillation to a maximum travel of about 1°, the surface area immediately adjacent any imperfection, such as the peak or valley in either of the faying surfaces is disturbed in a minimal manner which would not deleteriously detract from the bond. For example, a peak in one surface would form a groove in essentially only the area of the opposite surface in which the peak will conform so as to provide a substantially more intimate contact than previously obtainable. Thus, the greater surface tension provided by the more intimate contact together with the compressive load will join the faying surfaces with a solid-state bond exhibiting greater strength than achievable by employing the previously known oscillating procedures.

Other and further objects of the invention will be obvious upon an understanding of the illustrative method about to be described, or will be indicated in the appended claims, and various advantages not referred to herein will occur to one skilled in the art upon employment of the invention in practice.

Described generally, the present invention relates to a method of solid-state bonding metallic workpieces with the application of minimal or no external heat. The solid-state bonding method is practiced by the steps of machining the end surfaces of the workpieces to be joined to a maximum flatness obtainable by the machining procedure and then lapping the surfaces with a suitable stone or grinder until a flatness having the wave amplitude defined by the peak and valleys of less than 1 micrometer is obtained. These surfaces are then cleansed of impurities not part of the workpiece material, such as machining lubricants, oils, oxides, nitrides, and the like which would detract from the bond. After cleaning the surfaces, the mating surfaces are pressed together in a suitable vacuum chamber by the application of an axially applied force upone one or both of the workpieces. While this axially applied force is maintained, one of the workpieces is slowly oscillated in a rotary motion a distance of up to about 1°. This oscillation is achieved with a relatively slow movement of about 1 cycle per second. The purpose of the relatively slow oscillating movement is to smooth the surfaces to permit intimate contact between them. After oscillating the workpiece for a time determined sufficient to create the intimate contact and the desired surface tension between the faying surfaces, the oscillating movement is terminated and the faying surfaces are bonded together by the action of the surface tension created between the intimately contacting molecules of the surface material and the compressive axial loading forcing the workpiece surfaces together. It may be desirable, with some of the metals joinable by the method of the present invention, to apply successively greater axial forces upon the workpieces and also sufficient external heat for providing the surface tension necessary to establish the satisfactory bond between the workpieces.

It has been found that a satisfactory bond for many metals, such as exemplified by those set forth in the Examples below, can be achieved by employing room temperature conditions while other metals may require the application of external heat up to about 550° C. In any event, the heat externally applied to the workpieces is less than that which would cause softening and deformation of the contacting surfaces of the particular metals being joined.

The bonding is achieved in a vacuum environment to assure minimal formation of oxides or other contaminants on the mating surfaces during the oscillation and bonding operations so as to not detract from the bond. A vacuum in the range of about $10^{-6}$ to $10^{-9}$ torr is believed sufficient for the joining of the metals bondable by the solid-state procedure of the present invention.

In some instances, such as the joining of dissimilar metals, tungsten, tungsten alloys and stainless steels, the solid-state bonding operation is more satisfactorily achieved if a more bondable material than the base metal is disposed on the faying surfaces. For example, the application of a thin layer of gold, silver, or copper to the faying surfaces would provide a satisfactory bond between the workpieces which would be otherwise extremely difficult or impossible to join by solid-state bonding procedures. This layer or coating of metal deposited on the faying surfaces may be achieved by employing well known sputtering, vaor deposition, or plasma spraying techniques. If necessary, these coatings on the workpieces are leveled to a flatness of less than one micrometer prior to placing the faying surfaces together for effecting the solid-state bond.

The equipment employed in the solid-state bonding method is that which could be used to practice previously known solid-state bonding processes exept that the oscillation is limited to only about 1° of rotation and is effected in a manner substantially slower than previously practiced. For example, suitable equipment would include a vacuum chamber with a glove box for handling the workpieces inside the vacuum chamber. A double- or single-action ram and oscillator may be associated with the vacuum chamber for respectively applying the axially directed load upon the workpieces and the rotary movement of one of the workpieces.

In order to provide a more facile understanding of the present invention examples relating to typical joining operations are set forth below.

EXAMPLE I

In a demonstration of the invention, magnesium cylinders of engraving grade were joined with a solid-state bond. Each of the cylinders were 25.4 millimeters in length, 25.4 millimeters in diameter and 1.58 millimeters in wall thickness. The cylinders were cleaned in a solution of detergent and water, then rinsed with distilled water followed by a rinse in ethyl alcohol. The two cylinders were stationed in a fixture designed for aligning and holding them in position for the bonding operation as well as incorporating R.F. heating coils for applying external heat to the cylinder at their faying surfaces. The aligning and holding fixture was mounted on an oscillator adjusted to rotate the bottom cylinder 1°. The fixture was properly positioned and enclosed in a stainless steel vacuum chamber which was evacuated to $1 \times 10^{-8}$ torr for the joining operation. A compressive load of 1.17 MPa (1 $Pa \times 1.45 \times 10^{-4}$ psi) was applied axially to the cylinders with a manually operated double-acting hydraulic ram. Then, the bottom portion of the cylinder was oscillated 1° in a rotary motion for a total of 300 oscillations over a period of 7 minutes. The temperature of the sample was increased to 266° C. for the bonding operation which occurred upon the termination of the oscillation. The chamber was filled with inert gas and the fixture was transferred to the glove box for the dismantling operation. The bonded sample had a leak rate at the joint of $0.8 \times 10^{-7}$ torr/sec, a bond strength of 841 kg, and a tensile strength of 70.326 MPa.

EXAMPLE II

Magnesium cylinders similar to those described in Example I were prepared and subjected to the same bonding steps as in Example I except the compressive load was increased to 5.56 MPa. The resulting bond had a leak rate of less than $1.0 \times 10^{-10}$ torr/sec, a bond strength of 1030 kg, and a tensile strength of 86.080 MPa.

EXAMPLE III

In another demonstration of the invention, two cylindrical parts of oxygen-free, high conductivity grade copper were joined with a solid-state bond. The cylindrical copper parts had an outside diameter of 25.4 mm and a wall thickness of 2.54 mm. The mating surfaces of the parts were machined with a diamond tool to a flatness of 0.13 micrometers. The parts were cleaned in a solution of water and detergent and rinsed in distilled water. Then, the parts were given a final rinse in ethyl alcohol. The two cylindrical parts were aligned with contacted mating surfaces in a holding fixture and mounted on the oscillator system in the vacuum chamber. After closing and evacuating the chamber, successive compressive loads of 4.87, 9.76 and 14.62 MPa were axially applied to the contacted mating surfaces as the bottom cylinder was oscillated one degree for 220 cycles for each compressive loading. Pressure in the chamber was in the range of $10^{-6}$ to $10^{-9}$ torr. The bonding operation was performed at room temperature using only the friction heat generated by the oscillation. The solid-state bond was characterized by a leak rate of $0.8 \times 10^{-5}$ torr/sec and a tensile strength of 121.85 MPa.

EXAMPLE IV

Stainless steel (304) rods having a 25.4-mm-diameter and a 25.4-mm-length were prepared for the bonding operation by machining cylindrical configurations having a wall thickness of 2.54 mm on the mating ends of the rods. Then, these cylinders were faced on the lathe to a parallelism of 1.27 micrometers with the part mounting surface. The cylindrical mating surfaces of the rods were hand lapped to a mirror-like surface finish with a flatness of 0.15 micrometers. The rods were cleaned and rinsed in the manner described for Example I. A layer of gold 25 micrometers thick was vapor deposited on each of the mating surfaces and machined to a flatness of 0.15 micrometers. The rods were loaded into the holding fixture and mounted in the vacuum chamber for the bonding operation. Compressive loads of 14.617 and 170.713 MPa were successively applied to the rods while oscillating one of the rods 1° for 1320 oscillations during the first loading and 220 oscillations during the second loading. The rods were heated to 154° C. during the oscillation. The resulting bond possessed a leak rate of less than $1.0 \times 10^{-9}$ torr/sec and a tensile strength of 53.641 MPa.

EXAMPLE V

Tungsten cylinders having an outside diameter of 25.4 mm and a wall thickness of 2.54 mm were solid-state bonded. The mating surfaces of the cylinders were lapped to a flatness of 0.12 micrometers, cleaned in a solution of water and detergent, rinsed in distilled water, and given a final rinse in ethyl alcohol. The mating surfaces of the cylinders were cleaned by ion bombardment and coated with a layer of gold having a thickness of 25 micrometers by vapor deposition. The tungsten cylinders were solid-state bonded at room temperature by successively oscillating one of the cylinders 1° travel 2460 times at a pressure loading of 3.654 MPa and 1320 times at a pressure loading of 4.874 MPa. The bond had a tensile strength of 40.982 MPa.

It will be seen that the present invention provides a substantial improvement in solid-state bonding procedures wherein a low-speed oscillation over a very limited arc provides a more intimate contact between the faying surfaces to establish a better bond between the workpieces than previously obtainable.

What is claimed is:

1. A method for solid-state bonding of metallic workpieces comprising the steps of placing planar surfaces of each workpiece in a parallel abutting relationship with one another in an evacuated environment, applying an axially directed pressure loading on at least one of the workpieces for forcing said surfaces together, oscillating one of said workpieces in a rotary motion a maximum distance of up to about one degree of travel during the application of said loading, and terminating the oscillation for effecting the solid-state bond.

2. The method claimed in claim 1, comprising the additional step of providing the planar surfaces with a flatness of less than about one micrometer prior to placing them in the abutting relationship.

3. The method claimed in claim 1, wherein said oscillation is at a rate of about 1 cycle per second.